Nov. 6, 1962  F. W. SAMPSON  3,062,311
FRICTION GEAR THROTTLE CONTROL
Filed March 9, 1960
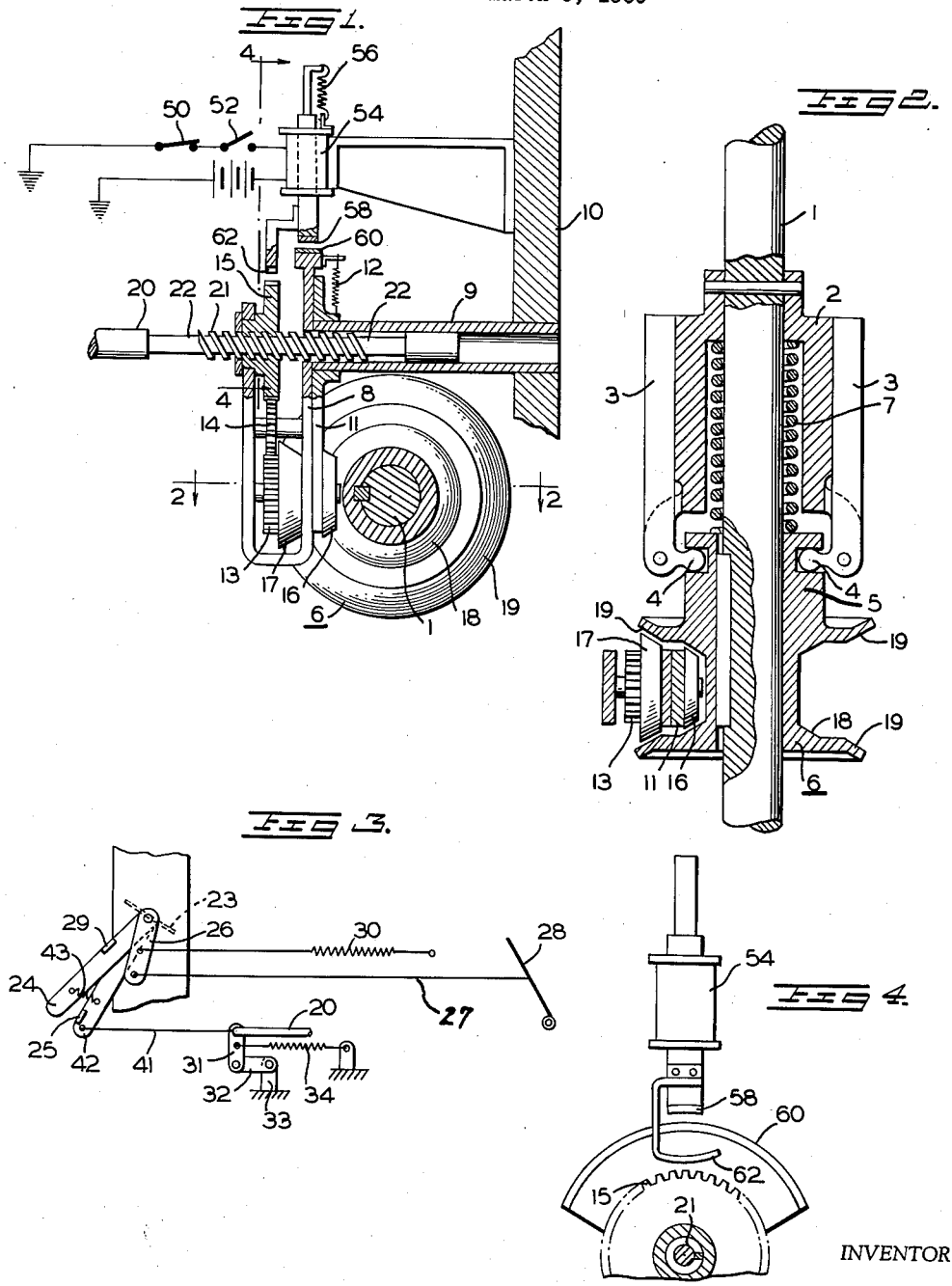
INVENTOR
FREDERICK W. SAMPSON
BY Frank J. Soucek
ATTORNEY

United States Patent Office 3,062,311
Patented Nov. 6, 1962

3,062,311
FRICTION GEAR THROTTLE CONTROL
Frederick W. Sampson, Dayton, Ohio, assignor to General Motors Corporation, Detroit, Mich., a corporation of Delaware
Filed Mar. 9, 1960, Ser. No. 13,938
12 Claims. (Cl. 180—82.1)

This invention relates to an automotive governor and more particularly to a governor that automatically controls the position of the automotive throttle butterfly valve.

One of the purposes of this invention is to provide a simple mechanical means for governing the speed of an automotive vehicle.

Another object is to provide a combination gear and screw means in conjunction with a governor controlled spool element to effect speed control.

A further object of this invention is to provide a simple mechanical governing device controllable by the vehicle driver, that is capable of mechanically sensing the vehicle speed and mechanically making an adjustment of that speed to a preselected setting established by the driver.

Other purposes and advantages of the present invention will become apparent from the description and drawing that form a part of this specification; however, it is to be understood that the invention is not confined solely to the particular details disclosed herein, as it should be realized that modifications may be made without departing from the inventive concepts herein disclosed.

FIGURE 1 is an elevational view with parts broken away and partly in section of a governor mechanism embodying the present invention and includes a schematic diagram of an electrical circuit that controls speed selection;

FIGURE 2 is a sectional view of the governor mechanism taken along lines 2—2 of FIGURE 1 and particularly disclosing the governor weight control;

FIGURE 3 is a schematic diagram of the linkage system interconnecting the governor, the accelerator pedal, and the vehicle throttle valve;

FIGURE 4 is a detailed view along line 4—4 of FIGURE 1.

Referring more particularly to the drawing, this invention includes a shaft 1 driven by the speedometer cable. The shaft 1 in turn drives a housing 2 fixedly secured to the shaft 1. The housing 2 pivotally supports governor weights 3 that have radially extending lugs 4 fitting within an axial extension 5 of a spool element 6. The spool element 6 is splined or keyed to the shaft 1 to thereby cause it to rotate with the shaft 1 and to the capable of axial movement relative to the shaft 1 and against the force of the spring 7. During rotation of the shaft 1, the governor weights 3 control the axial position of the spool element 6 against the force of the spring 7 in the conventional manner.

A lever 8 with a sleeve portion 9 is pivotally supported within a housing 10. A second lever 11 is pivotally supported on the sleeve 9. A spring 12 has one end secured to the lever 8 and the other end secured to the lever 11, and biases the two lever members into parallel rotational alignment. Relative rotation of lever 8 with respect to lever 11 in either direction will create a bias on the respective levers by the spring 12 to realign these lever members. The lever 8 rotationally supports mating gear members 13, 14 and 15. Lever member 11 rotationally supports a tapered idler wheel 16. The axes of the idler wheel 16 and the gear 13 are the same distance from the axis of the sleeve 9 so that the gear 13 and wheel 16 are coaxial when the levers 8 and 11 are aligned. A tapered friction wheel 17 forms an integral part of the gear 13.

The levers 8 and 11 with the respective friction wheels 17 and 16 extend within radial flanges of the spool element 6. The flanges have tapered surfaces 18 and 19 that respectively cooperate with the tapered surfaces of the wheels 16 and 17; however, there is a slight freedom of movement between the wheels 16 and 17 and the corresponding tapered surfaces of the spool 6. The amount of this freedom of movement will affect the sensitivity of the governor and therefore may be determined according to the particular needs of each installation. The freedom of movement between the idler wheel 16 and the surface 18 is less than the corresponding freedom of movement between the friction wheel 17 and the surface 19. This comparative larger freedom of movement of the wheel 17 is to prevent any frictional engagement of the wheel 17 when the lever members 8 and 11 are aligned, such as when the governor is deenergized.

A screw rod 20 is rotationally supported within the sleeve 9 and has threads 21 that cooperate with internal threads within the gear 15, so that rotation of the gear 15 brings about axial movement of the screw rod 20, gear 15 being axially secured. A recess 22 is provided at the ends of the screw threads 21, so that when the rod 20 has moved to its extreme position in either direction, a further rotation of the gear 15 will not cause binding between the gear 15 and the rod 20. When in this extreme position, the gear 15 may continue to rotate and its internal thread will freely revolve within the recess 22.

As shown in FIGURE 3, the rod 20 is connected to a link 41 that is in turn connected to a dummy lever 42 rotatably mounted on the axis of the throttle butterfly valve 23. A second lever 24 rotates the butterfly valve 23 and a spring 43 biases the dummy lever 42 to engage the throttle lever 24 through the abutment 25. A second dummy lever 26, also freely rotatable on the axis of the throttle butterfly valve, is actuated through a link 27 by the accelerator pedal 28. The dummy lever 26 engages the throttle lever 24 through the abutment 29. A conventional accelerator pedal return spring 30 biases the accelerator pedal and its linkage to the idle or release position.

Toggle links 31 and 32 are pivotally mounted to the rod 20 and to a fixed support 33 respectively to prevent rotational movement of the rod 20 but to allow the free axial movement for transmitting the governor action, hereinafter described, to the throttle butterfly valve. A spring 34 biases the link 31 to the right to effect a bias on the dummy lever 42 and on the rod 20 to position the rod in the "idle" position. The spring 34 has less of a bias on the lever 42 than the spring 43 secured between the levers 42 and 24, so that if the throttle lever 24 is opened by means of the accelerator pedal and its linkage, the dummy lever 42 will normally move in conjunction with the throttle lever 24, and the spring 34 will be extended. When the governor is selected for a desired speed however, other forces, as hereinafter described, will play on the rod 20 so that thereafter the dummy lever 42 will not necessarily move in conjunction with the throttle lever 24.

The electrical control circuit for the governor is shown in FIGURE 1 and includes the automobile battery as a source of power, a first switch 50 operated manually by the vehicle driver, a second switch 52 actuated by brake fluid pressure to open the circuit when the brake is applied, and a solenoid lock 54. The solenoid armature when the solenoid is deenergized is biased upwardly by the spring 56, but when the solenoid is energized the armature is forced downwardly so that the armature shoe 58 engages the surface 60 located on the outer arcuate perimeter of the lever 8, thereby locking the lever in a selected rotational position corresponding to the speed at which the vehicle is traveling when the solenoid is energized.

The solenoid armature has fixed thereto a resilient shoe 62 that frictionally engages the teeth of the gear 15 to prevent rotation of the gear 15 caused by the force of spring 34, or by the combination of springs 34 and 43.

*Operation*

In normal operation, without the use of the governor control, the accelerator pedal 28 directly controls the position of the throttle valve 23, and the lever 42 and rod 20 follow the motion of the throttle valve. The governor weights continuously position the spool element in an axial position according to the speed of the vehicle, and the idler wheel 16 is engaged by the frictional surface 18 to rotate or pivot the assembly consisting of the levers 8 and 11. During this non-governing period, the friction wheel 17 will not engage the friction surface 19, consequently the rod 20 is free to move axially and the levers 24 and 42 move together. To permit free axial movement of rod 20 during the non-governing period, the angle of screw thread 21 has been designed steep enough so that when rod 20 is pushed or pulled the gear nut 15 and gears 14 and 13 will rotate freely. The screw thread 21 has also been designed flat enough to permit rod 20 to move with ease when friction wheel 17 is rotated. Upon energizing the solenoid 54 by closing the switch 50, the lever 8 is locked and axial movement of rod 20 caused by the force of spring 34, or by the combination of springs 34 and 43 is prevented by means of the shoe 62 frictionally engaging the teeth of gear 15. The purpose of the controlled amount of friction applied by means of the shoe 62 is to hold the rod 20 stationary with respect to movement caused by the force of spring 34, or by the combination of springs 34 and 43 when the governor is not increasing or decreasing the throttle position. The accelerator pedal may then be released, the throttle valve remaining in its previous position. After the lever 8 is locked, the lever 11 and idler wheel 16 are still free to pivot to cooperate with the axial movement of the spool element 6. The idler wheel 16 continues to be engaged by the friction surface 18 and the lever 11 will pivot to take up the clearance between wheel 17 and surface 19, as the spool element 6 reciprocates in response to speed change, to allow wheel 17 to frictionally engage the surface 19 and drive gears 13, 14 and 15.

If the vehicle changes speed such as normally occurs upon climbing or descending a hill, the spool 6 is axially moved by the governor weights 3 and the friction wheel 17 is contacted causing it to rotate along with the gears 13, 14 and 15. Rotation of gear 15 axially moves the rod 20 to adjust the position of the throttle to thereby overcome the change in speed. When the speed reaches the governed speed, the spool element no longer engages the friction wheel 17, and the throttle valve remains in its set position until there is a further speed change in the vehicle. This governing process continues until the governing action is ended by manually opening the switch 50 or by depressing the brake, thereby opening the switch 52.

The length of the screw 21 and the positions of the annular grooves 22 are such as to give full displacement of the throttle valve between the fully closed and fully open position. When the throttle is fully opened or closed, a further drive by the spool element 6 only causes the gear 15 to run loosely in the groove 22, thereby precluding a binding of any of the moving elements.

If it is desired to accelerate the car during the governing action, it may be conventionally accomplished by depressing the accelerator pedal. When the accelerator pedal is released, the governor will again take over and control the vehicle at the selected speed.

It will be apparent that the description and drawing disclose only one specific embodiment of the invention and other embodiments may be made within the scope of this invention. I therefore intend not to limit myself to the particular device disclosed herein but only by the scope of the claims that follow.

I claim:

1. A governor for a vehicle having an engine with a throttle valve for control thereof, comprising: means sensing vehicle speed, a rotating spool member having first and second radially extending annular surfaces controlled by said means and axially positioned in accordance with said vehicle speed, a screw rod rotationally fixed and axially movable connected to said throttle valve and adapted to adjust the position of said throttle valve upon axial movement, a first lever coaxially and pivotally supported on the axis of said rod, a first gear with an internal screw thread engageable with the screw thread of said rod, a second gear rotatably mounted on said first lever in gear driving relationship with said first gear, said second gear having an annular friction surface having a clearance with but adapted to be driven in either rotational direction by said first annular surfaces of said spool member, a second lever pivotally supported coaxially with said first member, means biasing said first and second levers into parallel alignment, said second lever pivotally carrying an idler wheel, said idler wheel being in axial alignment with said second gear when the first and second levers are aligned by said biasing means, said idler member having a clearance with but adapted to be engaged by said second annular surfaces of said spool to cause said second lever to swing in conjunction with axial movement of said spool, the clearance between said idler member and said spool being less than the clearance between said friction surface and said spool to prevent frictional engagement between said friction surface and said spool when said first and second levers are in alignment, and vehicle operator controlled means adapted to lock the first lever to initiate governor action.

2. A governor for controlling the position of a vehicle throttle valve, comprising: an axially movable screw rod connected to said valve and adapted by axial movement to control the position thereof, a gear with an internal screw thread engaging said screw rod, a rotationally mounted, axially movable spool having opposing annular flanges, speed sensing means controlling the axial position of said spool, a lever pivotally mounted on the axis of said gear, and means carried by said lever adapted to drivingly connect individually the opposing annular flanges of said spool with said gear to move said rod in either axial direction as said spool moves axially from a preselected position.

3. A vehicle governor for controlling an engine throttle valve comprising; an axially movable screw rod connected to the throttle valve for adjusting the position of the throttle valve, a gear engaging said screw rod for axially positioning said rod, two levers swingingly supported on the axis of said rod and rotationally biased to a predetermined alignment, a rotating spool mounted adjacent said levers and axially positioned by speed sensing means, said spool having opposing annular substantially radial surfaces, the first of said levers having friction wheel means drivingly connected to said gear and having a clearance with but adapted to be driven in either rotational direction by said spool surfaces, the second of said levers supporting means having a clearance between said spool less than the clearance between said friction wheel and said spool surfaces, so that when said levers are in alignment the first lever will be out of engagement with said spool, and means adapted to lock said first lever in a predetermined position.

4. A governor mechanism for controlling the speed of a power plant having a power regulating device comprising; means sensing the speed of said device, a rotating spool having opposed substantially radial annular surfaces, a pivotally mounted lever adjacent said spool having a rotationally mounted wheel adapted to have driving contact with the opposed annular surfaces of said spool, said lever adapted to be held in a fixed pivotal position, said wheel and said spool having a clearance therebetween so that in one relative axial position of said spool there is no driving contact between said spool and said wheel, said speed sensing means varying the relative position of said spool and the pivot of said lever in a direction parallel to the axis of said spool, a non-rotationally mounted member connected to said regulating device and axially movable to effect regulation of said power plant, a member rotationally mounted on the pivotal axis of said lever axially driving said non-rotational member, and power transmitting means carried by said lever driving said last named rotational member upon rotation of said wheel.

5. The governor mechanism of claim 4 wherein the rotationally mounted member has internal threads and the non-rotational member has external threads, there being a driving cooperation therebetween.

6. The governor mechanism of claim 4 further comprising a third means adapted to prevent engagement of the spool and the wheel, and fourth means adapted to override said third means and allow said engagement.

7. The governor mechanism of claim 6 wherein said fourth means is selectively controlled by the power plant operator.

8. A governor mechanism for a power plant having a power regulating device, comprising; a non-rotationally mounted threaded member axially movable and adapted to be connected to said regulating device, a rotationally mounted threaded member engageable with said first named threaded member; a rotating spool member mounted adjacent said members and having opposed substantially radial annular surfaces, a power plant speed sensing means axially positioning said spool in accordance with sensed speed, a rotatively mounted wheel adapted to contact said spool, said wheel mounted permitting movement longitudinally of the axis of said spool member, power transmitting means connecting said rotationally mounted threaded member and said wheel, means preventing driving engagement of the wheel with said spool, and manually actuated means locking the wheel axis in a fixed position and overriding the driving engagement preventing means.

9. A governor mechanism for controlling a power plant speed regulating device comprising; an axially reciprocable but non-rotatable rod adapted upon reciprocation to effect adjustment of said speed regulating device, said rod having external threads along a portion thereof, a revolvable wheel coaxial with said rod having internal teeth cooperating with the external teeth on said rod, a lever pivotally supported about the axis of said rod, a rotatably driven spool having opposed substantially radial annular flanges, means sensing power plant speed axially shifting said spool upon a speed change, a member rotatably supported on said lever cooperating with said opposed flanges for driving engagement thereby, means selectively preventing driving engagement of the member and the spool, and means drivingly connecting said wheel and said member, said rod having annular recesses adjacent the ends of its threads whereby the wheel when concentric with said recesses may rotate without engaging the rod threads.

10. A governor mechanism for controlling the speed of a rotating member having a speed controlling device comprising; a rotating spool element having substantially radial opposed annular flanges, means axially reciprocating said spool element in accordance with the speed of said member, first and second levers pivotally mounted on the same axis, a first wheel rotatively mounted on said first lever, said wheel having a clearance with but adapted to be driven in either rotational direction by said annular flanges, means on said second lever adapted to engage said spool to swing said second lever with axial reciprocation of said spool, means biasing said levers into pivotal alignment to prevent engagement of said wheel with said spool, means transposing rotational movement of said wheel to control movement of said speed controlling device, and manually selective means overcoming said biasing means and locking the first lever in a fixed pivotal position.

11. A governor mechanism for a power plant having a power regulating device, comprising; a rotationally driven spool element having a plurality of substantially radial flanges, means axially positioning said spool element in accordance with a sensed speed, a rotationally mounted first wheel cooperating with said spool flanges and adapted to be rotatively driven at different angular velocities by said flanges upon driving contact with said flanges, means preventing contact between said flanges and said wheel, selectively operated locking means overriding said contact preventing means permitting contact of said flanges and said wheel in response to speed change, an axially reciprocal rod adapted upon reciprocation to adjust said power regulating device, and power transmitting means drivingly transposing the rotational movement of said wheel to axial movement of said rod.

12. A governor mechanism for a power plant having a power regulating device, comprising; a rotationally driven spool element having a plurality of substantially radial flanges, means axially positioning said spool element in accordance with a sensed speed, a rotationally mounted first wheel cooperating with said spool flanges and adapted to be rotatively driven at different angular velocities by said flanges upon driving contact with said flanges, said first wheel mounted on a first pivotally supported lever member, the axis of said pivot being coaxial with the rod axis, means selectively preventing contact between said flanges and said wheel, an axially reciprocal rod adapted upon reciprocation to adjust said power regulating device, power transmitting means drivingly transposing the rotational movement of said wheel to axial movement of said rod, said power transmitting means comprising threads on said rod, a rotationally mounted second wheel having threads engaging the threads on said rod, gear means rotationally mounted on said first member and drivingly connecting the first and second wheels; and a second lever member coaxially mounted with said first lever member, means biasing said lever members into alignment, means preventing driving contact between said first wheel and said flanges when the said levers are in alignment, and locking means locking said first lever and overriding said biasing means.

References Cited in the file of this patent

UNITED STATES PATENTS

| 169,719 | Miller | Nov. 9, 1875 |
| 2,283,478 | Warren | May 19, 1942 |
| 2,407,042 | Tippen | Sept. 3, 1946 |
| 2,755,877 | Kelem | July 24, 1956 |

FOREIGN PATENTS

| 46,149 | Denmark | Sept. 5, 1932 |